United States Patent
Frich et al.

(10) Patent No.: US 8,136,650 B2
(45) Date of Patent: Mar. 20, 2012

(54) APPARATUS AND METHODS FOR BOOK HANDLING

(75) Inventors: Mark R. Frich, Maplewood, MN (US); Kevin G. Frich, Oakdale, MN (US)

(73) Assignee: Bibliotheca ITG LLC, Norcross, GA (US)

( * ) Notice: Subject to any disclaimer, the term of this patent is extended or adjusted under 35 U.S.C. 154(b) by 399 days.

(21) Appl. No.: 12/151,228

(22) Filed: May 5, 2008

(65) Prior Publication Data

US 2009/0155029 A1 Jun. 18, 2009

Related U.S. Application Data

(60) Provisional application No. 60/927,712, filed on May 3, 2007.

(51) Int. Cl.
*B65G 47/00* (2006.01)
(52) U.S. Cl. ............... 198/349.6; 198/950; 414/271; 414/272; 414/331.09; 414/807
(58) Field of Classification Search ............ 414/271, 414/272, 331.09, 807; 198/349.95, 349.6, 198/350, 435, 950
See application file for complete search history.

(56) References Cited

U.S. PATENT DOCUMENTS

| | | | | |
|---|---|---|---|---|
| 3,455,621 A * | 7/1969 | Kingsley | ...................... | 312/211 |
| 3,695,462 A * | 10/1972 | Sullivan | ...................... | 414/273 |
| 3,884,370 A * | 5/1975 | Bradshaw et al. | ............ | 198/350 |
| 4,245,902 A * | 1/1981 | Cataldo et al. | ............... | 396/502 |
| 4,418,969 A * | 12/1983 | Hettman | ...................... | 312/249.9 |
| 5,932,982 A * | 8/1999 | Pezzelli, Jr. | .................. | 318/480 |
| 6,074,156 A | 6/2000 | Frich | | |
| 6,139,240 A * | 10/2000 | Ando | ........................... | 414/267 |
| 6,203,262 B1 | 3/2001 | Frich et al. | | |
| 6,257,816 B1 | 7/2001 | Frich | | |
| 6,325,586 B1 * | 12/2001 | Loy | .............................. | 414/281 |
| 6,422,457 B1 | 7/2002 | Frich et al. | | |
| 6,557,696 B1 | 5/2003 | Frich | | |
| 6,561,418 B1 | 5/2003 | Frich | | |
| 6,793,139 B2 | 9/2004 | Frich | | |
| 6,814,535 B1 * | 11/2004 | Maness | ........................ | 414/807 |
| 6,994,252 B2 | 2/2006 | Frich | | |
| 2007/0020067 A1 * | 1/2007 | Lin et al. | ................... | 414/331.09 |

* cited by examiner

*Primary Examiner* — Scott Lowe
(74) *Attorney, Agent, or Firm* — Clise, Billion & Cyr, P.A.; Benjamin Armitage

(57) ABSTRACT

Apparatus and methods for the management of books returned by patrons in a library or similar setting are disclosed. In various aspects, apparatus for receiving a book from a patron, conveying the book, and placing the book onto a book collector in a near vertical orientation as well as associated methods are disclosed.

19 Claims, 10 Drawing Sheets

APPARATUS AND METHODS FOR BOOK HANDLING

CROSS-REFERENCE TO RELATED APPLICATIONS

The present application claims the benefit and priority of U.S. provisional patent application No. 60/927,712 filed on May 3, 2007, the disclosure of which is hereby incorporated herein in its entirety by reference thereto.

BACKGROUND

1. Field

The present apparatus and methods relate to material handling, and, more particularly to the handling of books within a library or similar setting.

2. Background of the Related Art

Automated systems are available for handling books, for example, books returned by patrons in a library setting. In various aspects, books may include periodicals, other written materials, and may include various recorded media. The patron or clerk places the book into the automated system, and the automated system transports the book and places the book into a cart or suchlike.

However, currently available automated systems may be mechanically complex, expensive to maintain, and suffer from various other deficiencies. Accordingly, a need exists for improved book handling apparatus.

SUMMARY

Apparatus and methods disclosed herein may resolve many of the needs and shortcomings discussed above and may provide additional improvements and advantages recognizable by those of ordinary skill in the art upon study of this disclosure.

A book handling apparatus is disclosed herein. In various aspects, the book handling apparatus includes a book receiver that defines a slot therethrough. The slot is adapted to allow a patron to place a book therein with the book in a near vertical orientation. The book handling apparatus includes, in various aspects, a conveyor system operably engaged with the slot to receive the book from the slot in the near vertical orientation, and the conveyor system is adapted to convey the book thereabout in the near vertical orientation. The book handling apparatus includes, in various aspects, a book collector operably disposed proximate the conveyor system to receive the book therein from the conveyor system with the book in the near vertical orientation.

The methods disclosed herein, in various aspects, include receiving a book into a slot from a patron, the slot causing the orienting of the book into a near vertical orientation, communicating the book in the near vertical orientation from the slot onto a conveyor system, conveying the book about the conveyor system in the near vertical orientation, and delivering the book in the generally vertical orientation into a book collector by the conveyor system. The methods include detecting the identity of the book, delivering the book into a particular book collector chosen from amongst a plurality of book collectors using the identity of the book in various aspects. The methods may include delivering the book into a particular portion of the book collector depending upon the identity of the book.

Other features and advantages of the apparatus and systems disclosed herein will become apparent from the following detailed description and from the claims.

Figure 1A:
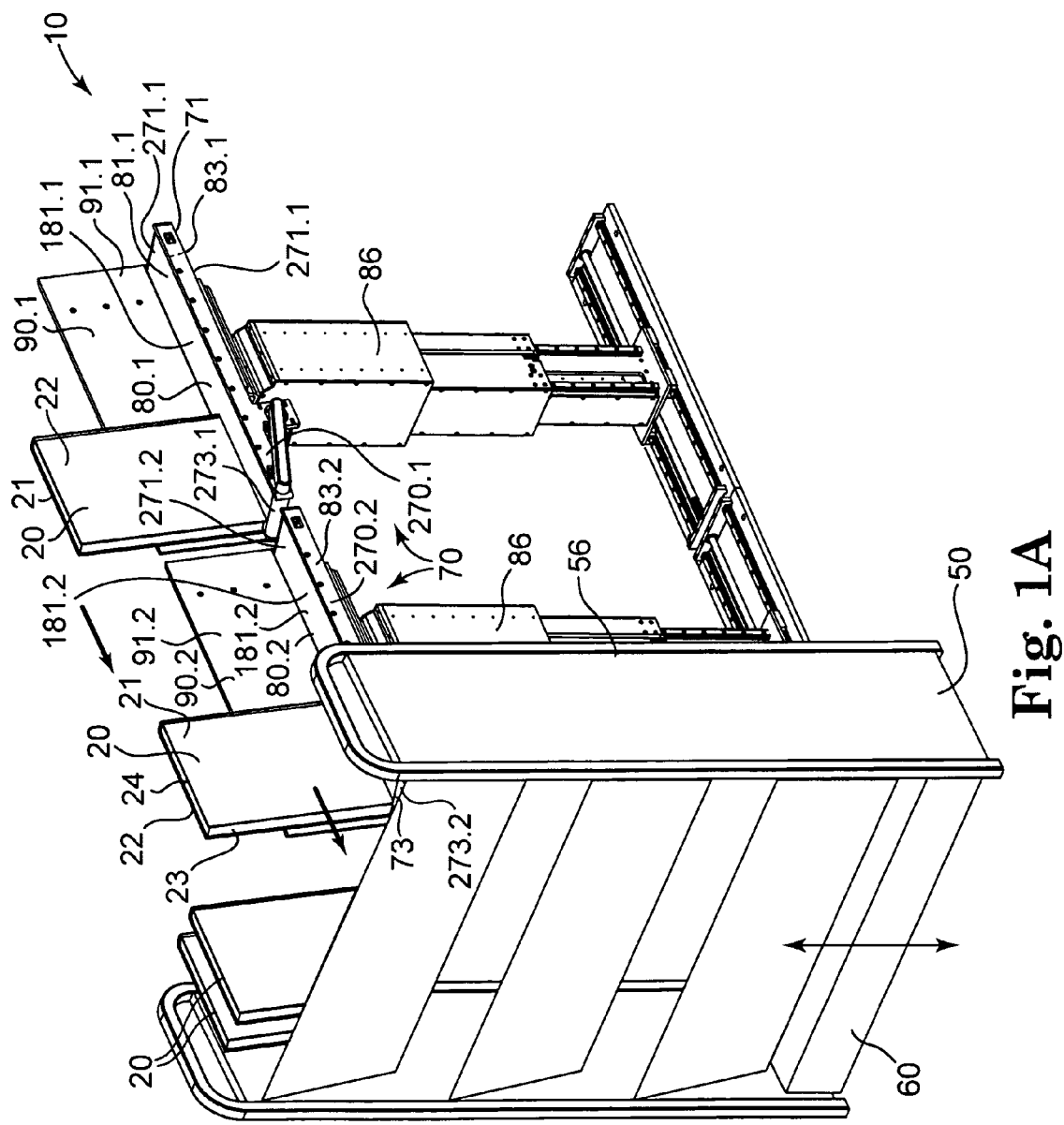
FIG. 1A illustrates in a perspective view an exemplary embodiment of portions of a book handling apparatus.

All Figures are illustrated for ease of explanation of the basic teachings of the present invention only. The extensions of the Figures with respect to number, position, order, relationship and dimensions will be explained or will be within the ordinary skill of the art after the description has been studied. Furthermore, the apparatus, materials and other operational parameters to conform to specific size, force, weight, strength, velocity, temperatures, flow, and similar requirements will likewise be within the ordinary skill of the art after the description has been studied. Where used in reference to the figures, the terms "top," "bottom," "right," "left," "forward," "rear," "first," "second," "inside," "outside," and similar terms should be understood to reference the structure and methods described in the specification and illustrated in the drawings and are utilized for purposes of explanation.

DETAILED DESCRIPTION

A book handling apparatus and methods for aggregating books are disclosed herein. The book handling apparatus and methods may be used to manage books returned by patrons in a library, repository, or similar setting. The book handling apparatus, in various aspects, includes a slot defined by a book receiver and a conveyor system in communication with the slot. The patron may return the book through the slot of the book receiver. The slot invites the patron to pass the book therethrough with the book in a near vertical orientation, and the slot boundaries of the slot guide the book onto the conveyor system with the book in the near vertical orientation. The conveyor system maintains the book in the near vertical orientation while conveying the book. The book may be conveyed to a book collector, which, in various aspects, could be a bin, a book truck, or suchlike for the aggregation of books, and placed therein. In various aspects, the book is placed into the book collector in the near vertical orientation. In various aspects, the book is placed into the book collector in the near vertical orientation. One or more detectors may be located about the slot to identify the book as the book is passed therethrough. An information management system is included in the book handling apparatus in various aspects to manage inventory including the receipt of the book, to regulate the interaction of the patron with the book handling apparatus, and/or to direct the path of the book through the book handling apparatus.

In various aspects, a plurality of conveyor segments may cooperate with one another to form the conveyor system, and the book may be conveyed about by at least a portion of the conveyor segments that form the conveyor system. A plurality of slots is arranged about the one or more conveyor segments of the conveyor system, and the one or more conveyor segments cooperate with the one or more slots and with one another to distribute books amongst the book collectors in various aspects. In some aspects, the conveyor segment is positionable with one or more degrees of freedom. For example, the conveyor segment may be vertically positionable, may be rotatable in a horizontal plane, may be tiltable such that the conveyor segment may assume a variety of orientations with respect to the horizontal, and/or may be traversable in one or more directions within the horizontal plane to cooperate with multiple slots, to cooperate with multiple book collectors, to distribute books about a particular collector, and/or to cooperate with other conveyor segments of the conveyor system. A lift may be provided, in various aspects, to orient the book collector with respect to the conveyor system for placement of the book therein.

The methods may include receiving a book into the slot from a patron, the slot causing the orienting of the book into a near vertical orientation, communicating the book in the near vertical orientation from the slot onto a conveyor system, conveying the book about the conveyor system in the near vertical orientation, and delivering the book in the near vertical orientation into a book collector by the conveyor system, in various aspects.

The Figures generally illustrate various exemplary implementations of the book handling apparatus and methods. The particular exemplary implementations illustrated in the Figures provide for ease of explanation and understanding, even while being fully descriptive. These illustrated implementations are not meant to limit the scope of coverage, but, instead, to assist in understanding the context of the language used in this specification and in the claims. Accordingly, variations of the book handling apparatus and methods that differ from the illustrated implementations may be encompassed by the appended claims.

With general reference to the Figures, book 20, as used herein, includes books, magazines, sheet music, and other printed material. Book 20, in various aspects, could include other materials as would be generally found in a library or other archive, such as video materials, sound recordings, and other visual, audio, audio-visual, and printed media and the attendant packages thereof. The book 20, in various aspects, has a generally rectangular parallelepiped configuration and defines a first cover portion 21 and a second cover portion 22 connected by a spine 23, a first edge 24, a second edge 25, and a third edge 26. The first cover portion 21 and the second cover portion 22 are generally in planar alignment and are defined by portions of the cover of the book, in various aspects, with the spine 23, the first edge 24, the second edge 25, and the third edge 26 generally perpendicular to the planes of the first cover portion 21 and the second cover portion 22. In various aspects, the spine 23 is defined by the spine of the book, and the first edge 24, the second edge 25, and the third edge 26 are generally defined by the edges of the pages of the book 20.

The slot 30, in various aspects, is defined by a book receiver 40. The book receiver 40 defines a book receiver first side 42 and a book receiver second side 44, and the slot 30 is formed as a passageway between the book receiver first side 42 and the book receiver second side 44. The book receiver 40 is generally oriented, in various aspects, with the book receiver first side 42 approachable by patrons. The slot 30 is designed to invite patrons to insert books 20 therein in order to pass the books 20 from the book receiver first side 42 to the book receiver second side 44, and, accordingly, may have a generally book-like shape, which may be described as an elongated rectangular shape. In various aspects, one or more gates or similar structures may be mounted about the slot 30, for example, to control the insertion of books 20 into the slot 30, prevent the insertion of nefarious materials into the slot 30, protect the slot 30 from the weather, and/or prevent the removal of books 20 from the book receiver second side 44 through the slot 30. Various mechanisms may be disposed about the slot 30 to aid in the insertion of the book 20 into the slot 30 and to communicate the book 20 through the slot 30 and onto the conveyor system 70.

The slot 30 is generally oriented at a near vertical angle, and the near vertical angle ranges from about 0° (vertical) to about 45° in various aspects. The near vertical angle is about 10° in some aspects. In order to pass through the slot 30, the book 20 is generally aligned with the slot 30 so that the book 20 has the near vertical orientation. In the near vertical orientation, the plane of either the first cover portion 21 or the plane of the second cover portion 22 are generally oriented at the near vertical angle.

One or more detectors 47 may be located about the slot 30 to detect the insertion of the book 20 into the slot 30 and/or identify the book 20 as the book 20 is passed through the slot 30. Upon detection of the insertion of the book 20 into the slot 30, the gate(s) may open and at least portions of the conveyor system 70 and/or other components of the book handling apparatus 10 may be activated. The detector 47 may be a motion detector, barcode scanner, radio-frequency identification (RFID) antenna, or suchlike that reads identification information such as barcode and RFID tags that may be associated with the book 20. The detector(s) 47 is in communication with an information management system 110 that regulates the book handling apparatus 10 in various aspects.

The conveyor system 70 includes one or more conveyor segments 270 in various aspects. A conveyor system first end 71 is operably linked with the slot 30 generally about the book receiver second side 44 of the book receiver 40 to receive the book 20 inserted through the slot 30 onto the conveyor system 70. The book 20 may be conveyed from the conveyor first end 71 to the conveyor second end 73 upon conveyor belt(s) 80 of the conveyor segment(s) 270 that form the conveyor system 70. The conveyor segment(s) 270 that form the conveyor system 70 cooperate with the slot 30 to receive the book 20 onto the conveyor system, cooperate with one another to convey the book 20 about the conveyor system 70, and cooperate with one or more book collectors 50 to deliver the book into one of the one or more book collectors 50.

The conveyor segment 270 has a conveyor segment first end 271 and a conveyor segment second end 273, and includes a conveyor belt 80 that extends generally from the conveyor segment first end 271 to the conveyor segment second end 273 to convey books 20 generally between the conveyor segment first end 271 and the conveyor segment second end 273. The conveyor segment 270 may include a motor mechanically coupled with the conveyor belt 80 to provide a source of locomotion for the conveyor belt 80. The conveyor segment 270 is supported on one or more legs 86, which may include other support structures, and the leg(s) 86 may be affixed to the floor, a wall, or other such structural element in various aspects. The conveyor segment 270 may cooperate with one or more motors, for example, to vertically position the conveyor segment 270, rotate the conveyor segment 270 about a vertical axis in a horizontal plane, tilt the conveyor 70 with respect to the horizontal, and/or traverse the conveyor 70 in the horizontal plane.

The conveyor belt 80 can be made, for example, of various natural and/or synthetic rubberous materials. Composite materials such as synthetic rubber with fiberglass strands embedded therein could be used for the conveyor belt as well as other materials and combinations of materials as would be recognized by those of ordinary skill in the art upon study of this disclosure. In various aspects, engine timing belts could be employed as the conveyor belt 80. The conveyor belt 80 defines an outer surface 81 and an inner surface 82. The inner surface 82 in some aspects includes teeth to engage gears and so forth to allow the impartation of locomotive force to the conveyor belt 80. The outer surface 81 may be generally formed to frictionally engage the book 20 in order that the conveyor belt 81 may convey the book 20 along the conveyor segment 270 between the conveyor segment first end 271 and the conveyor segment second end 273. In various aspects, the outer surface 81 may be ribbed, roughened, or otherwise adapted to enhance the ability of the outer surface 81 to engage the book 20.

The conveyor segment 270 includes a conveyor arm 90. In some aspects, the conveyor arm 90 is fixedly secured to the conveyor segment 270 proximate the conveyor belt 80 to define a generally continuous arm surface 91, which is generally flat and generally extends between the conveyor segment first end 271 and the conveyor segment second end 273. The arm surface 91 is generally aligned at a right angle with respect to a conveyance surface 181 defined by the upper portion of the outer surface 81 of the conveyor belt 80 and at the near vertical angle with respect to the vertical in various aspects. The conveyor arm 90 may be made of metal such as steel or aluminum, of various plastics, or combinations thereof, and the conveyor arm 90 formed such that the arm surface 91 is generally smooth to allow the book 20 to slide thereupon. The arm surface 91 may be polished metal, smooth plastic, metal surfaced with smooth plastic, and so forth. In various aspects, the conveyor arm 90 could be formed of one or more rails, bars, rods, cables, and suchlike fixed to the conveyor 70, generally defining the arm surface 91, and extending generally from the conveyor segment first end 271 to the conveyor segment second end 273 that would allow portions of the book 20 to slide thereupon.

The conveyor arm 90 maintains the book 20 in the near vertical orientation as the book 20 is conveyed upon the conveyance surface 181 of the conveyor belt 80 between the conveyor segment first end 271 and the conveyor second end 273. Accordingly, the book 20 may be received from the slot 30 onto the outer surface 81 of the conveyor belt 80 in the near vertical orientation with the first cover portion 21 or the second cover portion 22 generally biased against the arm surface, and the spine 23, the first edge 24, the second edge 25, or the third edge 26 generally biased against the conveyance surface 181 of the outer surface 81 of the conveyor belt. The book 20 is conveyed generally between the conveyor segment first end 71 and the conveyor segment second end 273 in the near vertical orientation by the conveyor belt 80 while resting upon the outer surface 81 of the conveyor belt 80 and sliding along the arm surface 91.

In some aspects, a plurality of conveyor arms 90 could be affixed about the conveyor belt 80 to move with the conveyor belt 80. The conveyor arms 90 define arm surfaces 91 that are generally perpendicular to the conveyor belt surface 81 and angled at the near vertical angle with the vertical. Accordingly, the book 20 would pass from the slot 30 onto the outer surface 81 of the conveyor belt 80 and onto the arm surface 91 with the book 20 in the near vertical orientation to be engaged with the outer surface 81 of the conveyor belt 80 and with one or more of the conveyor arms 90. In such aspects, the book 20 would be conveyed in the near vertical orientation by the conveyor belt 80 and one or more conveyor arms 90 between the conveyor segment first end 71 and the conveyor segment second end 273 while engaged with the arm surface 91 of one or more of the conveyor arms 90. The book 20 would generally be engaged with the arm surface(s) 91 to move with the arm surface(s) 91 as opposed to sliding along the arm surface 91 relative to the arm surface 91 in such aspects and, accordingly, the arm surface 91 could be formed to frictionally engage the book 20.

In various aspects, the book collector 50 could be a book truck 56, which is a cart with one or more shelves 57 and generally tailored to transport books 20, a bin 51, or similar within which the books 20 may be collected. The book truck 56, in some aspects, is generally engaged with the conveyor segment 270, and the conveyor segment 270 may deliver books 20 in the near vertical orientation onto shelve(s) 57 of the book truck 56. A lift 60 may engage the book truck 56 in order to position the book truck 56 with respect to the conveyor segment 270 to allow the conveyor segment 270 to deliver books 20 into the book truck 56. For example, the lift 60 may lift the book truck 56 in the vertical direction and/or traverse the book truck 56 in the horizontal plane to align the shelve(s) 57 with the conveyor segment 270 so that books 20 in the near vertical orientation on the conveyor segment 270 may be delivered in the near vertical orientation from the conveyor segment 270 onto the shelve(s) 57. In other aspects, the book cart 56 may be constructed with shelve(s) 57 angled or otherwise aligned to receive books 20 in the near vertical orientation from the conveyor segment 270 with the book cart 56 resting upon the floor without need of the lift 60. In still other aspects, the book cart 56 may rest upon the floor, and the conveyor segment 270 is oriented to deliver books 20 in the near vertical orientation onto the book cart 56.

In other aspects, the book collector 50 is a bin 51. The bin 51 includes bin walls 53 that define a bin cavity 54 that may either be open or sealable by a removable cover. The bin 51 may include wheels to allow the bin 51 to be pushed about, and/or the bin 51 may be designed to be manipulated by a hoist, crane or similar contrivance. The bin 51 may be engaged with the conveyor segment 270 such that the conveyor segment 270 may place books 20 into the bin 51 generally in a vertical orientation and/or near vertical orientation.

In some aspects, the information management system 110 may detect the position of the conveyor segment 270 with respect to the book collector 50. The information management system 110 may traverse the conveyor segment 270 in the horizontal plane, in the vertical direction, radially about the vertical axis, or otherwise position the conveyor segment 270 with respect to the book collector 50 in order to distribute the books 20 about the book collector 50. The information management system 110 may use the lift 60 to traverse the book collector 50 with respect to the conveyor segment 270 in order to distribute the books 20 about the book collector 50.

The lift 60 may be a jack, hoist, lift, or similar to orient the book collector 50 with respect to the conveyor segment 270 so that the conveyor segment 270 may deliver books 20 into the book collector 50. The lift 60 is mounted on a floor, wall, or other structural support to be generally in a fixed location in some aspects, or the lift 60 is generally locationally movable in other aspects. The lift 60 has one or more positioning members by which the lift 60 may engage the book collector 50 in order to position the book collector 50 with respect to the conveyor 70. The positioning member may be a framework of structural members, tines as, for example, in a forklift, clamp(s), hook(s), or suchlike formed to engage the book collector. The lift 60 includes one or more lift motors in mechanical cooperation with the positioning member(s) to position the positioning member(s) in various aspects.

The information management system 110 is a software system in communication with portions of the book handling apparatus 10 in order to control portions of the book handling apparatus 10. The information management system 110 may reside on one or more computers located generally proximate other portions of the book handling apparatus 10, or at remote location(s) in networked communication, or combinations thereof. The information management system 110 may identify the patron, may regulate access, may track the receipt of the book 20, may manage inventory including the account of the patron, and may direct the placement of the book 20 into a particular book collector 50 or into a particular location within a particular book collector 50. In various aspects, the information management system 110 communicates with the lift 60, the conveyor segment(s) 270 that form the conveyor system 70, the book receiver 40, and/or other portions of the book handling apparatus 10 to control the lift 60, the conveyor system 70, the book receiver 40, and/or other portions of the book handling apparatus 10. Various electromechanical controls and/or microcontroller(s) may be included within the lift 60, the conveyor system 70, and/or the book receiver 40 or otherwise placed about the book handling apparatus 10 in operable communication with the information management system 110 and in communication with, for example, the various motors located about the book handling apparatus 10 to allow the information management system 110 to control the operation thereof.

Various patron interface(s) 112 such as video displays, card readers, keypads, and biometric sensors may be located on the book receiver first side 42 to identify the patron and/or communicate with the patron, and the patron interface(s) 112 may be in communication with the information management system 110. Accordingly, for example, the patron may provide a card with information imbedded therein to be read by the card reader, the patron may use the keypad to key in an identification number, or the patron may provide a biometric such as a thumbprint. In some aspects, the patron interface 112 includes a printer to write a paper receipt that may include account information. The written receipt is apprehendable by the patron on the book receiver first side 42. In other aspects, the patron interface 112 writes the written receipt to magnetic media, a smart card, optical media, or suchlike and otherwise interacts therewith.

Upon identification of the patron, the information management system 110 may allow the patron to deposit the book 20 into the slot 30 of the book receiver 40. For example, the information management system 110 may be in operable communication with one or more gates mounted about the slot 30 to open the one or more gates and thereby allow the patron to place the book 20 into the slot 30.

One or more detectors 47 that detect the insertion of the book 20 into the slot 30 and/or identify the book 20 are in communication with the information management system 110 in various aspects. Upon detection of the insertion of the book 20 into the slot 30 by the detector(s) 47, the information management system 110 may activate portions of the book handling apparatus 10 including portions of the conveyor system 70 to convey the book 20 into the book collector 50. The information management system 110 may utilize the identity of the book 20 and direct the book 20 to a particular book collector 50 and/or to a particular location within a particular book collector 50. The information management system 110 may utilize the identity of the book 20 to track receipt of the book 20, update the account of the patron, and conduct other inventory management functions.

Various sensible indicia and/or sensor(s) may be placed, for example, about the lift 60, the book collector 50, the book receiver 40, the conveyor 70, and/or otherwise placed about the book handling apparatus 10. The sensible indicia could be, for example, various reflectors, bar coding, targets such as laser targets, and so forth, and the sensor could be, for example, a laser, a bar code reader, an infrared sensor, ultrasonic sensor, and so forth as could, for example, sense the sensible indicia or otherwise provide information about the book handling apparatus 10 to the information management system 110.

The sensible indicia and/or sensors may allow the information management system to identify the book collector 50 and/or to determine the position of the book collector 50 and the conveyor segment 270 with respect to one another, and the information management system 110 may alter the position of the book collector 50 and/or the conveyor segment 270 with respect to one another. The information management system 110 may alter the position of the conveyor 70 in response to the identity of the book 20 and/or the identity of the book collector 50 to direct the book 20 into a specific book collector 50 or into a specific portion of a specific book collector 50. Sensor(s) may determine the status of the book collector 50 such as whether or not the book collector 50 has been filled and the information management system 110 may direct books 20 through the book handling apparatus 10 based upon the status of the book collector(s) 50 in various aspects.

FIG. 1A illustrates an exemplary embodiment of the book handling apparatus 10. As shown in FIG. 1A, the book handling apparatus 10 includes a conveyor system 70 with conveyor system first end 71 and conveyor system second end 73. The conveyor system 70 includes a first conveyor segment 270.1 and a second conveyor segment 270.2. The conveyor segment first end 271.1 of the first conveyor segment 270.1 is engaged with the slot 35 (not shown) to receive books in the near vertical orientation via the slot 35. The conveyor segment second end 273.1 of the first conveyor segment 270.1 is engaged with the conveyor segment first end 271.2 of the second conveyor segment 270.2 to allow books to pass between the first conveyor segment 270.1 and the second conveyor segment 270.2. The conveyor system 70 is supported by legs 86 which are set upon the floor, as illustrated. The conveyor segments 270.1, 270.2 include belts 80.1, 80.2 with inner surfaces 83.1, 83.2 and outer surfaces 81.1, 81.2. Portions of the outer surfaces 81.1, 81.2 define conveyor surfaces 181.1, 181.2 upon which the receive books 20 are received and conveyed. The conveyor segments 270.1, 270.2 include conveyor arms 90.1, 90.2 with arm surfaces 91.1, 91.2 generally perpendicular to the conveyor surfaces 181.1, 181.2 of the conveyor belts 80.1, 80.2. Books 20 are received onto the conveyor surfaces 181.1, 181.2 of the conveyor belts 80.1, 80.2 in the near vertical orientation with the first cover portion 21 or the second cover portion 22 biased against the arm surfaces 91.1, 91.2 of the arms 90.1, 90.2, as illustrated. The spine 23, first edge 24, second edge 25, or third edge 26 of the books 20 is biased against the conveyor surfaces 181.1, 181.2 of the conveyor belts 80.1, 80.2. The arm surfaces 91.1, 91.2 of the conveyor arms 90.1, 90.2 extend generally between the conveyor segment first ends 271.1, 271.2 and the conveyor segment second ends 273.1, 273.2 of the conveyor segments 270.1, 270.2 in this embodiment.

The conveyor segment second end 273.2 of the second conveyor segment 270.2 is configured to communicate with book truck 56 to place books 20 on the shelves 57 in the near vertical orientation. As illustrated in FIG. 1A, the books 20 are in the near vertical orientation and the book truck 56 rests upon the lift 60 so that the lift 60 may orient the book truck 56 with respect to the conveyor segment 270.2.

The lift 60 orients the book truck 56 to receive books 20 from the conveyor 70 in the embodiment of FIG. 1A. In various embodiments the legs 86 may adjust, the lift 60 may orient the book truck 30 with respect to the conveyor segment 270.2, and/or the conveyor segment 270.2 may be positioned to distribute books 20 about the various shelves 57 of the book truck 56. When the book truck 56 has been filled with books 20, the lift 60 may reposition the book truck 56 so that the book truck 56 may be removed from the lift 60 and conveyed to other areas.

Figure 1B:
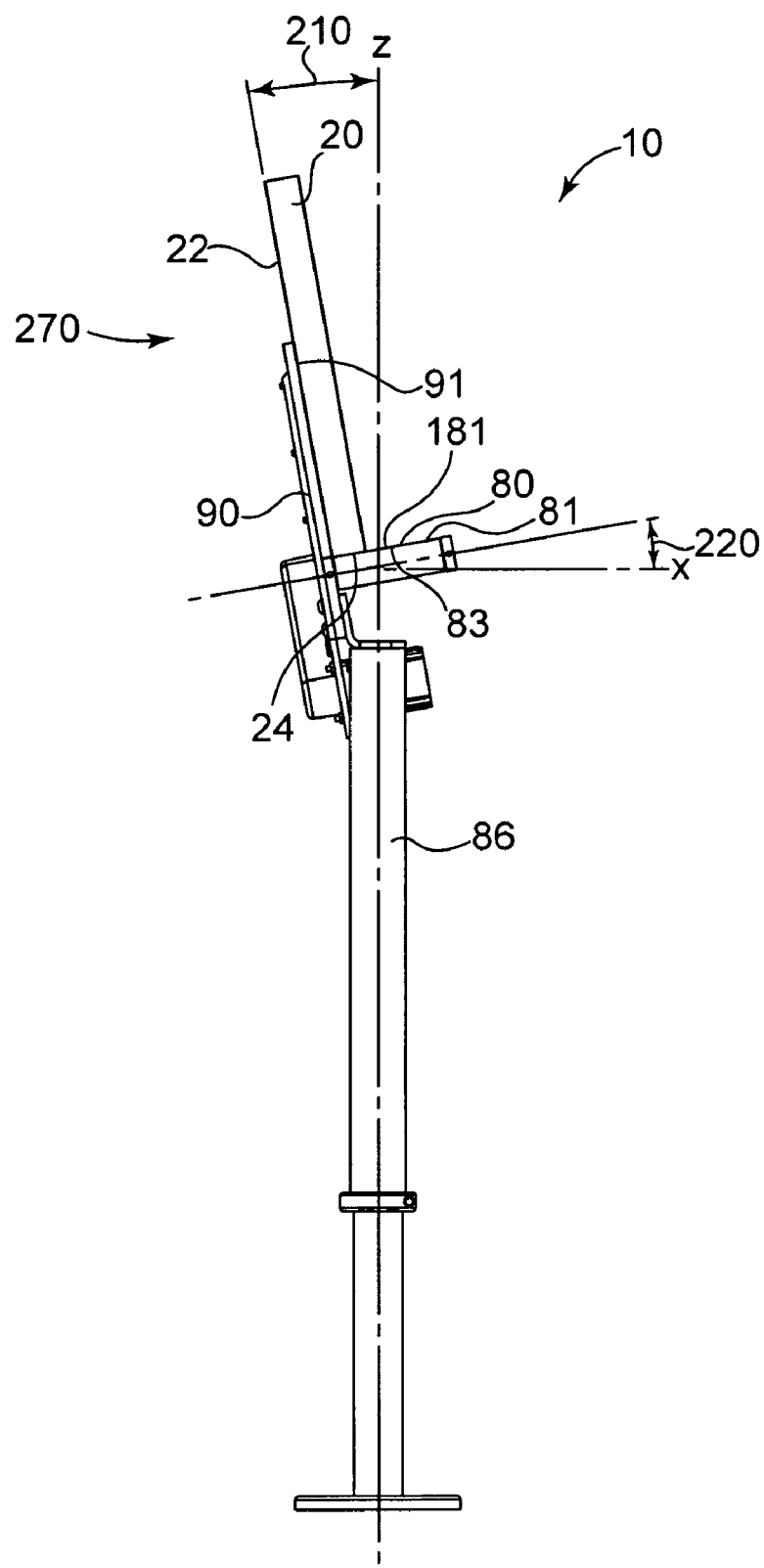
FIG. 1B illustrates in a cross-sectional view a portion of the exemplary book handling apparatus of FIG. 1.

FIG. 1B illustrates a cross-sectional view of the conveyor segment 270 in general correspondence to the conveyor segments 270.1, 270.2 illustrated in FIG. 1A. As illustrated in FIG. 1B, the arm surface 91 of the arm 90 is canted at a first angle 210 with respect to the vertical, and the conveyance surface 181 defined by the upper portion of the outer surface 81 of the conveyor belt 80 is canted at a second angle 220 with respect to the horizontal. The conveyance surface 181, as illustrated, is generally planar, but could have other configurations in various embodiments. The first angle 210, as illustrated, is about 10° and the arm surface 91 is generally at a right angle with respect to the conveyance surface 181 so that the second angle 220 is also about 10°. In various embodiments, the first angle 210 may range from 0° [vertical] up to about 45°. The second angle 220 may range from 0° [horizontal] up to about 45°, and the arm surface 91 may be disposed at other than a right angle with respect to the conveyance surface 181, in various embodiments. Book 20 is transported by the conveyor belt 80 of the conveyor segment 270 in the near vertical orientation, as illustrated, with the second cover portion 22 generally biased against the arm surface 91 and the first edge 24 generally resting upon the outer surface 81 of the conveyor belt 80. The second cover portion 22 slides along the arm surface 91 as the book 20 is conveyed upon the conveyance surface 181 in the near vertical orientation between the conveyor segment first end 271 and the conveyor segment second end 273. In the near vertical orientation, either the first cover portion 21 or the second cover portion 22 may be biased against the arm surface 91 and the first edge 24, the second edge 25, third edge 26, or spine 23 may rest upon the conveyance surface 181 of the conveyor belt 80.

Figure 2A:
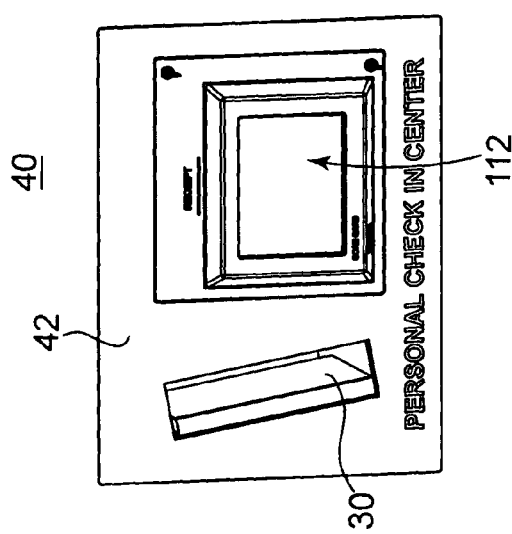
FIG. 2A illustrates in a perspective view portions of an exemplary embodiment of the book receiver.

FIG. 2A illustrates an embodiment of the book receiver 40 as generally viewed from the book receiver first side 42. The book receiver 40 includes patron interface 112, which encompasses a video display and a card reader in this embodiment, and slot 30. The conveyor system 70 communicates with the slot 30 proximate the book receiver second side 44 of the book receiver 40. A patron may place the book 20 into the slot 30 defined by the book receiver 40 and the book 20 may then pass thru the slot 30 to be received generally onto the conveyor system 70. The slot 30 invites the patron to place the book 100 therein in the near vertical orientation, and the book 20 passes through the slot 30 and onto the conveyor system 70 in the near vertical orientation. The book 20 is maintained in the near vertical orientation by the arm surface(s) 91 and the outer surface(s) 81 of the conveyor belt(s) 80 of the one or more conveyor segments 270 that form the conveyor system 70 as the book 20 is conveyed about the conveyor system 70 to the book collector 50.

Figure 2B:
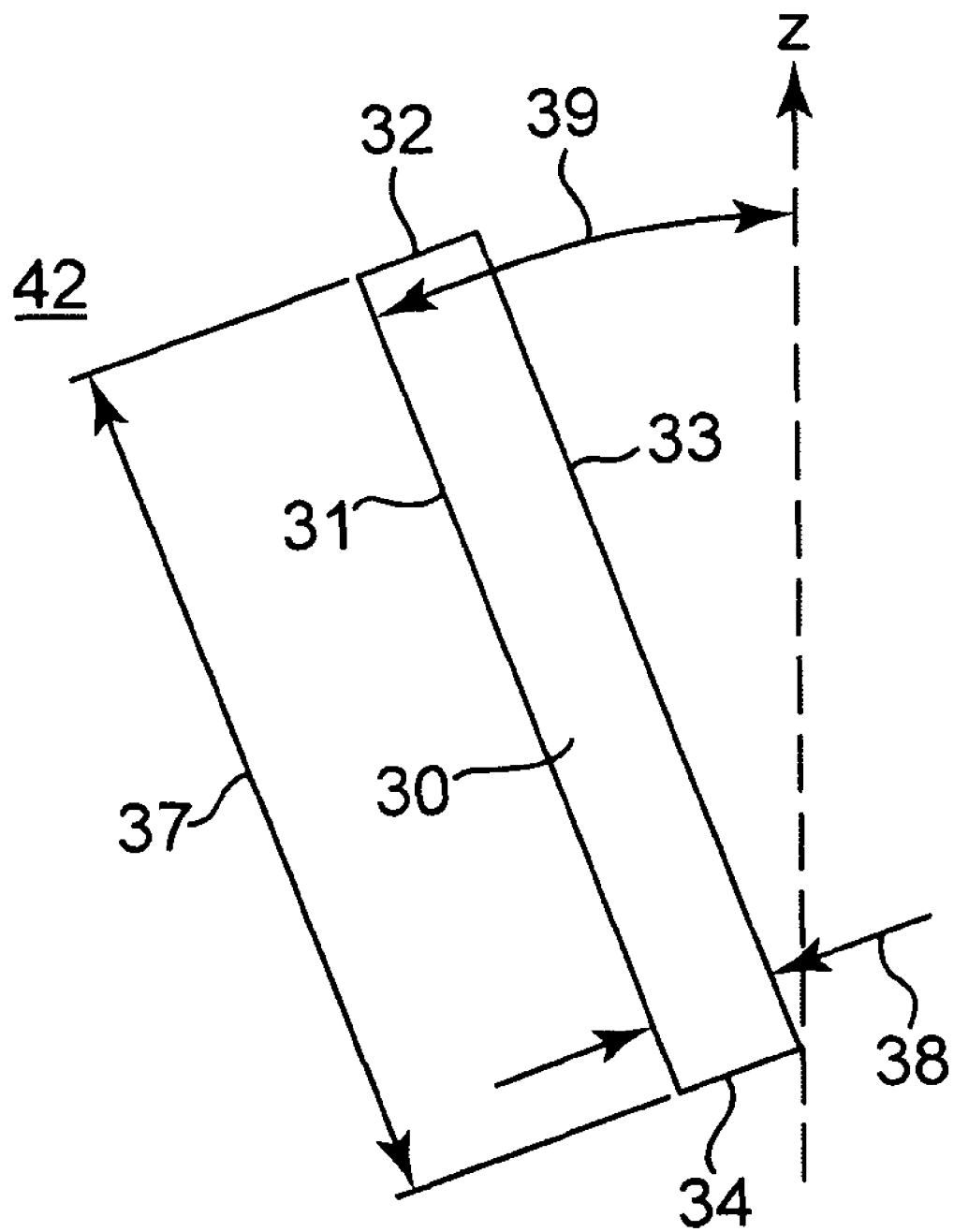
FIG. 2B illustrates in a frontal view the slot of FIG. 2A.

FIG. 2B illustrates an embodiment of the slot 30 in generally correspondence to the slot of FIG. 2A. As illustrated, the slot 30 is defined by a slot first side 31, a slot second side 32, a slot third side 33, and a slot fourth side 34. The slot first side 31 is generally parallel to the slot third side 33 and defines slot angle 39 with respect to the vertical (z) axis, as illustrated. The slot angle 39 may range from about 0° [vertical] up to about 45° in various embodiments, and may generally conform to the first angle 210 of the arm 90 to facilitate exchange of books 20 in the near vertical orientation between the slot 30 and the conveyor system 70. In some embodiments, the slot angle 39 is about 10°. The slot second side 32 and the slot fourth side 34 are generally parallel to one another and generally at right angles with respect to slot first side 31 and slot third side 33 in this illustrated embodiment. The book 20 may be inserted into the slot 30 such that the first cover portion 21 and the second cover portion 22 are generally aligned with the slot first side 31 and the slot third side 33, which positions the book 20 in the near vertical orientation. The spine 23, the first edge 24, the second edge, 25, and/or the third edge 26 would be aligned with the slot second side 32 and the slot fourth side 34. The slot 30, as illustrated, has a slot length 37 along the slot first side 31 and the slot third side 33 and a slot width 38 along the slot second side 32 and the slot fourth side 34. The slot length 37 is greater than the slot width 38 in various embodiments. For example, the slot length 37 is about 16" and the slot width 38 is about 4" in a particular exemplary embodiment. In other embodiments, the slot length 37 and slot width 38 may be chosen to accommodate the materials within a particular library.

Figure 3:
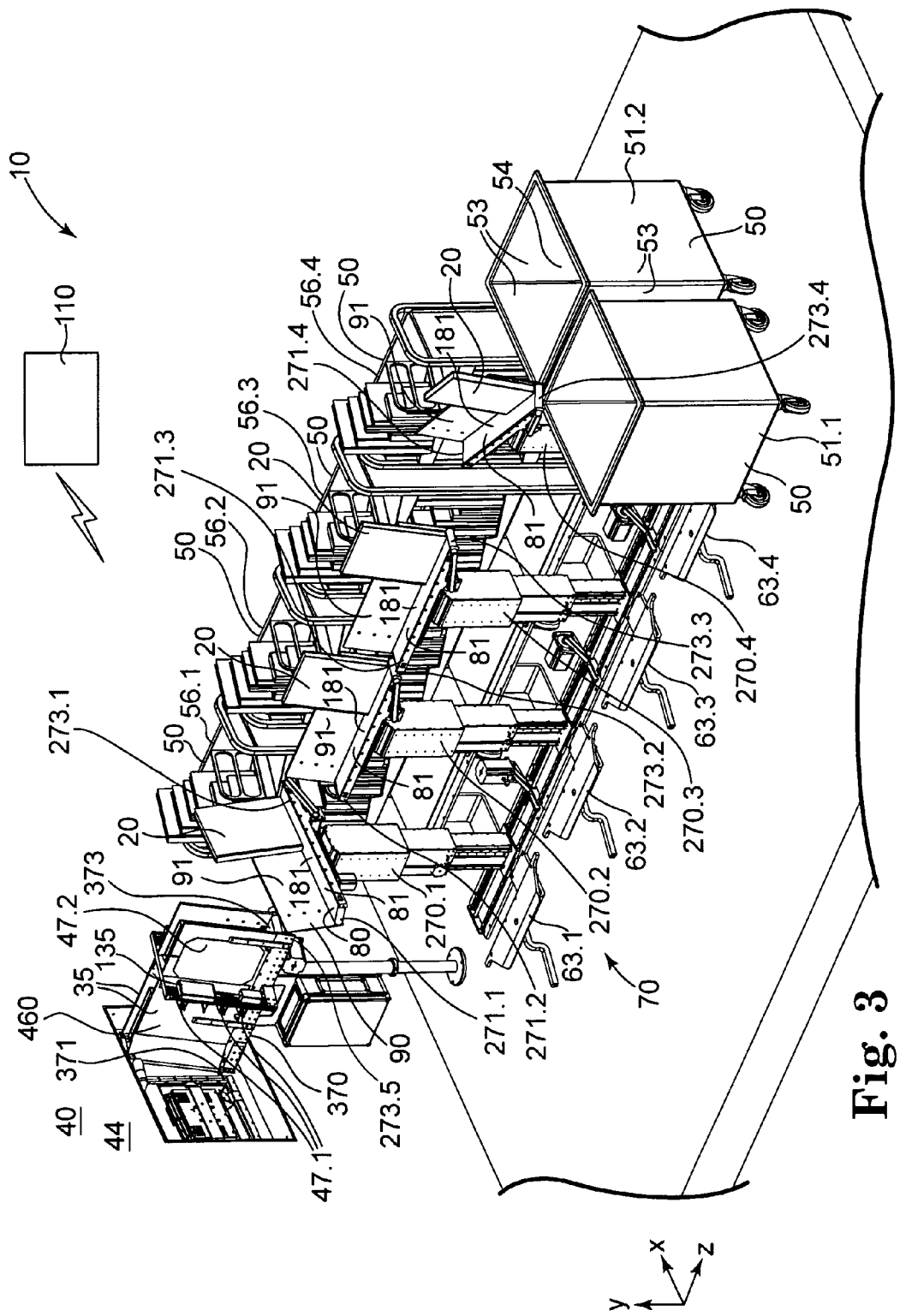
FIG. 3 illustrates in a perspective view portions of an exemplary embodiment of the book handling apparatus.

FIG. 3 illustrates an embodiment of portions of the book handling apparatus 10. As illustrated in FIG. 3, the conveyor system 70 includes several conveyor segments 270.1, 270.2, 270.3, 270.4 that cooperate with one another and are positionable to deliver books 20 into the book trucks 56.1, 56.2, 56.3, and 56.4 and/or bins 51.1, 51.2, respectively. Truck locks 63, such as truck locks 63.1, 63.2, 63.3, 63.4 engage the book trucks 56 while the book trucks 56 rest upon the floor in order to retain securely the book trucks 56 to allow the delivery of books 20 therein from the conveyor system 70. The conveyor system 70 includes check-in conveyor segment 370, which is connected to the slot 30 on the book receiver second side 44 of the book receiver 40. The check-in conveyor segment 370 has slot guides 35 on either side to maintain the book 20 in the near vertical orientation as the book passes from the slot 35 through check-in conveyor 370 from check-in conveyor first end 371 to check-in conveyor second end 373. The check-in conveyor 370 in various embodiments includes belt 80 or is otherwise formed to convey the book 20 from the check in conveyor first end 371 to the check in conveyor second end 373. As illustrated, the slot guide 35 has a translucent portion 135 formed from optical glass. Detectors 47.1 in the form of bar code readers are positioned about the translucent portion 135 to read barcodes on book 20 in order to identify book 20. Detector 47.2 in the form of RFID antenna are positioned about the slot guide 35 to read the RFID tag in order to identify the book. Detectors equivalent to detectors 47.1, 47.2 may be located on the opposite side of the slot guide 35 and may otherwise be disposed about the check-in conveyor 370 in various embodiments.

As illustrated, conveyor segment 270.1 articulates to engage the check in conveyor second end 373 of the check in conveyor 370 to receive the book 20 from the check in conveyor 370. As illustrated, conveyor segment 270.1 rotates about the vertical axis and is positionable in the horizontal plane and with respect to the vertical in order to deliver the book 20 into book truck 56.1. Similarly, conveyor segments 270.2, 270.3, 270.4 cooperate with one another and rotate about the vertical and are positioned in the horizontal plane and with respect to the vertical in order to deliver books 20 into book into the book trucks 56.2, 56.3, and 56.4 and/or bins 51.1, 51.2 respectively.

The book 20 may be delivered to either of bins 51.1, 51.2 or a book truck 56 chosen from amongst book trucks 56.1, 56.2, 56.3, and 56.4 as directed by the information management system 110 and dependent upon the identity of the book 20 and/or the status and/or identity of book trucks 56.1, 56.2, 56.3, and 56.4 and/or bins 51.1, 51.2. The information management system 110, as illustrated, may communicate with the detector 47.1, 47.2, and with other portions of the book handling apparatus 10 in order to control the book handling apparatus 10. In other embodiments, a plurality of book trucks 56, bins 51, other book collectors 50, and combinations thereof could be located about the conveyor system 70 and the conveyor segment(s) 270 pivot, tilt, and/or otherwise move to distribute books 20 thereabout.

Figure 4A:
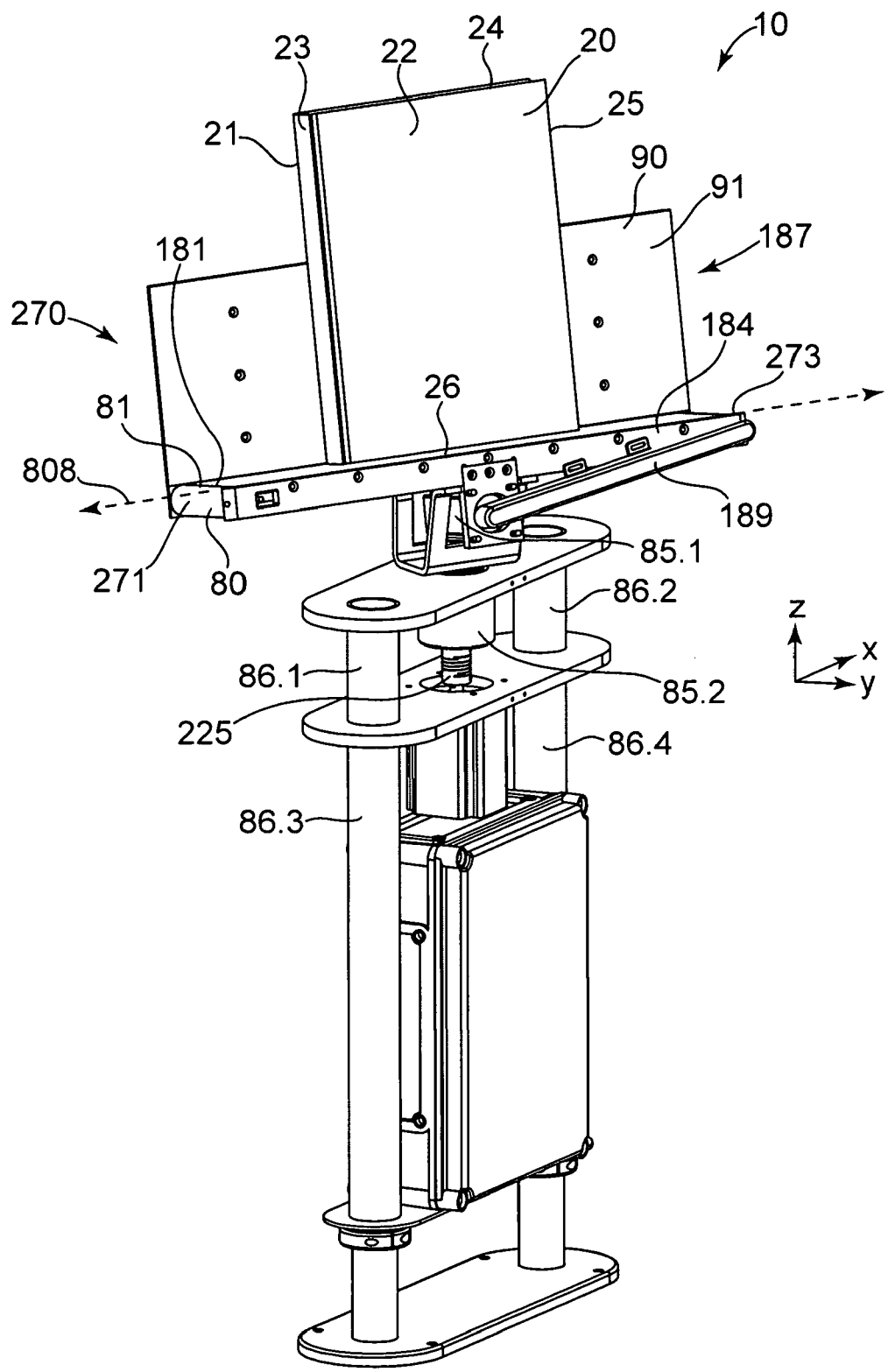
FIG. 4A illustrates in a perspective view an exemplary embodiment of a conveyor segment.
Figure 4B:
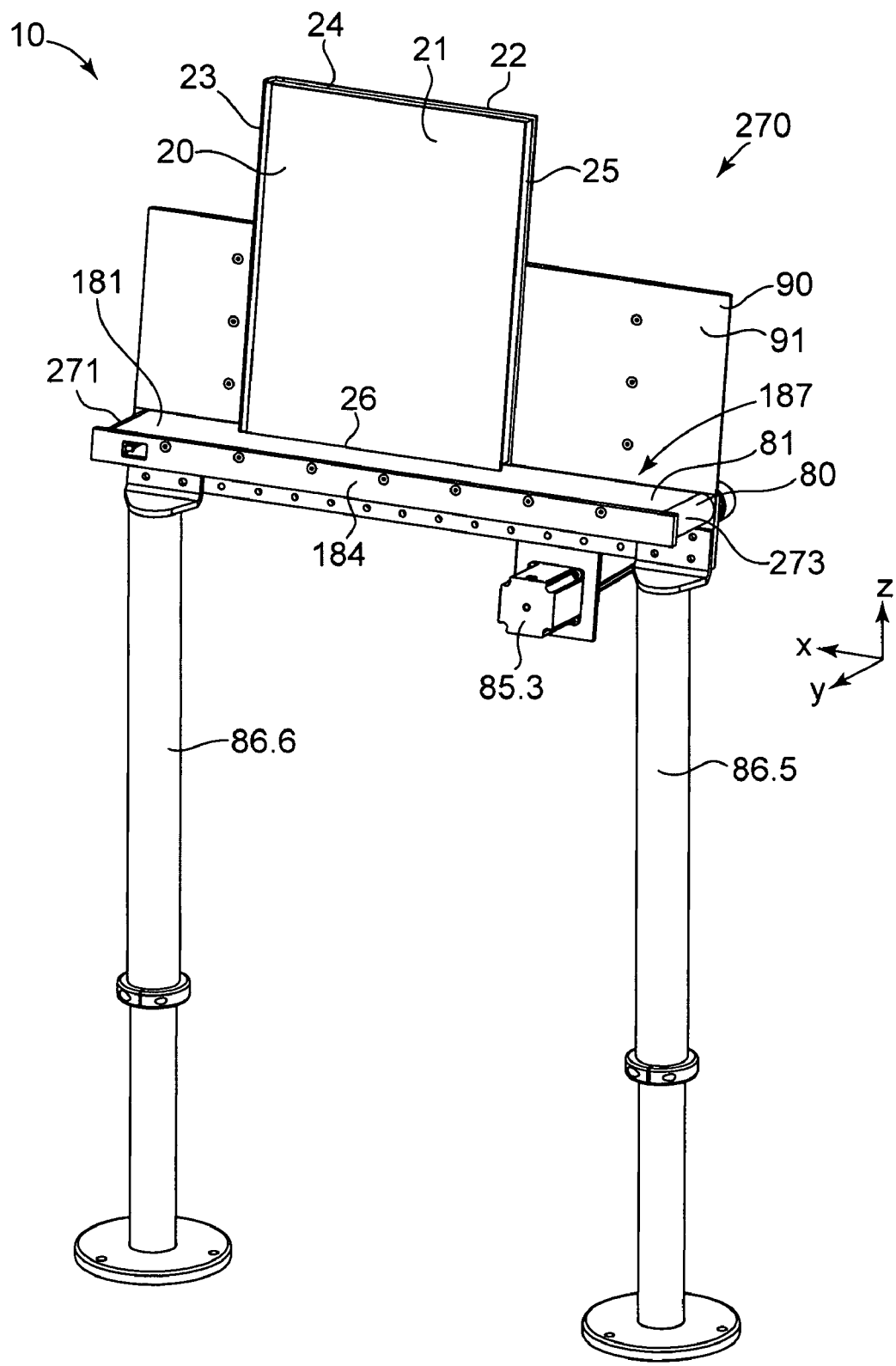
FIG. 4B illustrates in a perspective view another exemplary embodiment of a conveyor segment.

FIGS. 4A and 4B illustrate exemplary embodiments of the conveyor segment 270. With continuing reference to FIG. 4A in the following, book 20 rests in the near vertical orientation with third edge 26 upon the conveyor surface 181 of the conveyor belt 80 and with the first cover portion 21 biased against the arm surface 91 of conveyor arm 90. The first cover portion 21 slides along arm surface 91 as the conveyor belt 80 advances and the book 20 is conveyed along the conveyor segment 270 between the conveyor segment first end 271 and the conveyor segment second end 273 in the near vertical orientation. The belt 80 is secured within conveyor housing 184 and the conveyor arm 90 is secured to the conveyor housing 184 in fixed relation to the belt 80 such that the arm surface 91 and the upper portion of the belt outer surface 81 form a conveyor platform 187 upon which the book 20 rests in this embodiment.

Motor 85.2 is linked to shaft 225 to rotate the shaft 225 in order to rotate the conveyor platform 187 in the horizontal (x-y) plane about the vertical (z) axis to position the conveyor segment first end 271 and the conveyor segment second end 273 in the horizontal (x-y) plane. The shaft 225 may extend/contract, and legs 86.1 86.2 are slidably received within legs 86.3, 86.4 so that the position of the conveyor platform 187 with respect to the vertical (z) axis may be altered. The conveyor segment first end 271 and the conveyor segment second end 273 define a longitudinal axis 808, as shown. Motor 85.1 connects with conveyor arm 189 to pivot conveyor arm 189 in order to move the conveyor platform 187 in the direction of the longitudinal axis 808 and/or change the angle of the longitudinal axis 808 with respect to the vertical (z) axis (i.e. change the tilt of the conveyor platform 187). The conveyor segment 270 including the conveyor platform 187 may move in other ways with respect to the x-y-z coordinate system, and various motors, hydraulic systems, gearing, mechanical connections, controllers, and suchlike may be included in the conveyor segment 270 to effectuate such movements in various embodiments and otherwise operate, as would be recognized by those of ordinary skill in the art upon review of this disclosure, and these may be in communication with the information management system 110.

Another embodiment of the conveyor segment 270 is illustrated in FIG. 4B. With continuing reference to FIG. 4B in the following, book 20 rests with third edge 26 upon the conveyor surface 181 of the conveyor belt 80 and with the second cover portion 22 biased against the arm surface 91 of conveyor arm 90. The second cover portion 22 slides along arm surface 91 as the conveyor belt 80 advances and the book 20 is conveyed along the conveyor segment 270 between the conveyor segment first end 271 and the conveyor segment second end 273 in the near vertical orientation. The belt 80 is secured within conveyor housing 184 and the conveyor arm 90 is secured to the conveyor housing 184 in fixed relation to the belt 80 such that the arm surface 91 and the upper portion of the belt outer surface 81 form conveyor platform 187 upon which the book 20 rests.

In this embodiment, the conveyor housing 184 is engaged with legs 86.5, 86.6, which are affixed to the floor. Legs 86.5, 86.6 maintain the conveyor housing 184 and, hence, the conveyor platform 187 in fixed orientation with respect to the x-y-z coordinates as illustrated. Motor 85.3 is in mechanical communication with the belt 80 to drive the belt 80. Various mechanical connections, controllers, and suchlike may be included in the conveyor segment 270 to effectuate operation thereof in various embodiments, as would be recognized by those of ordinary skill in the art upon review of this disclosure, and these may be in communication with the information management system 110.

Figure 5:
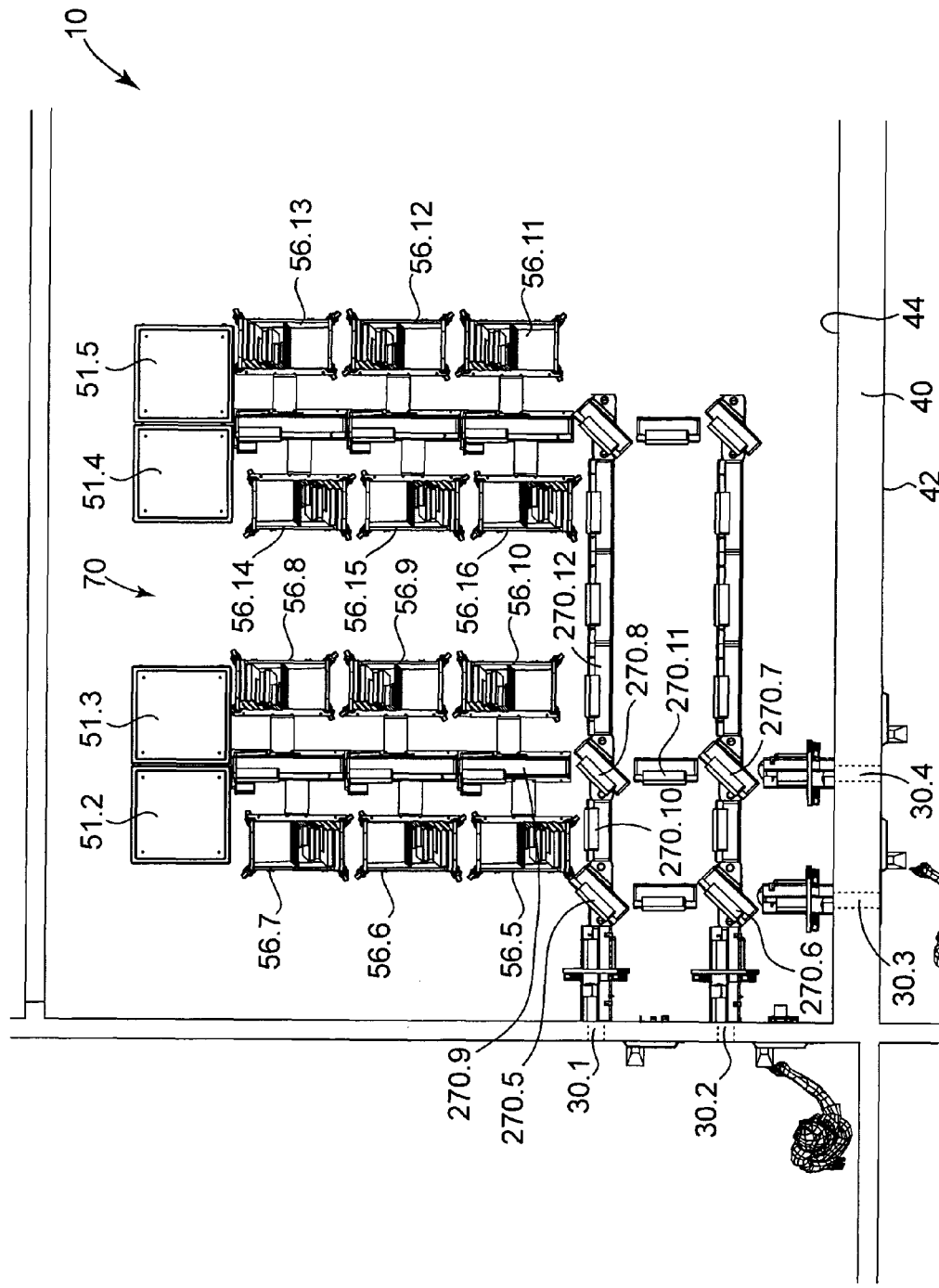
FIG. 5 illustrates in a plan view an exemplary embodiment of a book handling apparatus.

FIG. 5 illustrates an embodiment of the book handling apparatus 10 with multiple slots 30.1, 30.2, 30.3, 30.4 in the book receiver 40. The conveyor system 70 has many conveyor segments 270 arranged about many book collectors 50. The book collectors 50, as illustrated, include bins 51 and book trucks 56. As illustrated, the conveyor system 70 includes conveyor segments 270.5, 270.6, 270.7 that engage slots 30.1, 30.2, 30.3, 30.4 to receive books 20 onto the conveyor system 70. As illustrated, conveyor segment 270.6 is positionable to engage slots 30.2, 30.3 to receive books 20 onto the conveyor system 70 via either slot 30.2, 30.3, and is illustrated generally midway between slots 30.2, 30.3. Conveyor segment 270.8 is positionable to engage either conveyor segments 270.10, 270.12 or 270.9, 270.11 in order to direct books 20 to, for example, book truck 56.11 or book truck 56.10, respectively, and is illustrated in mid-position. Conveyor segment 270.9 is positionable to engage either book truck 56.5 or book truck 56.10 in order to deliver book 20 thereto. Other conveyor segments 270 may be positionable including those illustrated in mid-position in order to direct books 20 to various book collectors 50 located about the conveyor system 70 via various paths through the conveyor system 70. The conveyor segments 270 of the conveyor system 70 may be arranged in a generally linear geometric pattern, may bifurcate as in this illustrated embodiment, or may be arranged in other geometric patterns.

Figure 6:
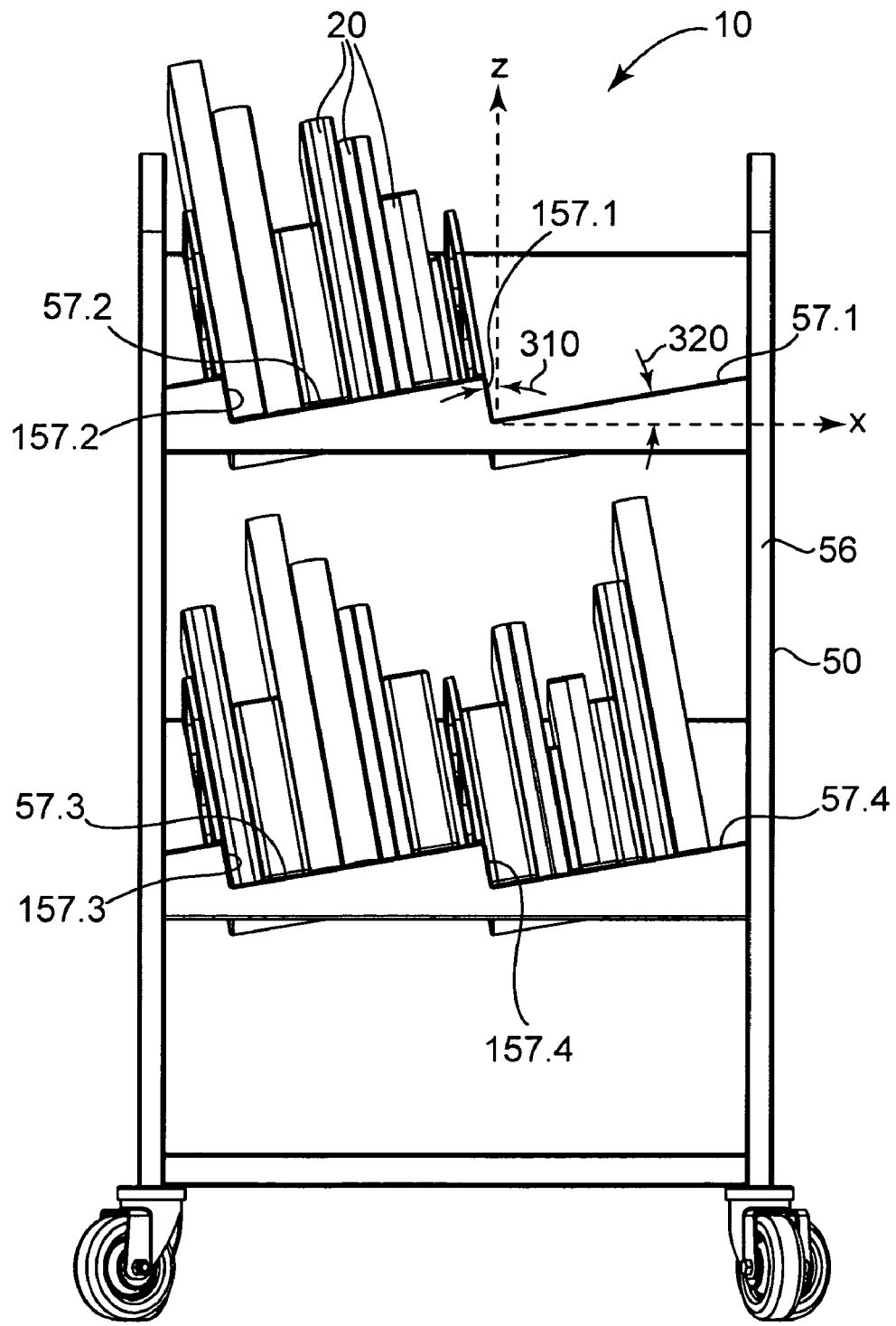
FIG. 6 illustrates in a frontal view an exemplary embodiment of a book truck.

An embodiment of the book collector 50 in the form of book truck 56 is illustrated in FIG. 6. In this embodiment, the book truck 56 includes shelves 57.1, 57.2, 57.3, 57.4. As illustrated the shelf 57.1 is stepped with riser 157.1. The riser 157.1 defines a first shelf angle 310 with respect to the vertical and the shelf 57.1 defines a second shelf angle 320 with respect to the horizontal, as illustrated. The first shelf angle 310 is generally equal to the second shelf angle 320 in this illustrated embodiment, but the first shelf angle 310 and the second shelf angle 320 could differ from one another and/or could differ between shelves 57 in various other embodiments. The first shelf angle 310 may range from about 0° [vertical] up to about 45° in various embodiments, and the first shelf angle 310 may be about 110° in certain embodiments. The second shelf angle 320 may range from about 0° [horizontal] up to about 45° in various embodiments and the second shelf angle 320 may be about 10° in certain embodiments. The first shelf angle 310 and the second shelf angle 320 are adapted to maintain the books 20 in the near vertical orientation, and may generally conform to the first angle 210 and the second angle 220, respectively, of the conveyor arm 90 to allow the conveyor segment 270 to deliver book(s) 20 in the near vertical orientation onto the shelve(s) 57.1, 57.2, 57.3, 57.4 of the book truck 56. As illustrated, the book(s) 20 are in the near vertical orientation onto the shelve(s) 57.1, 57.2, 57.3, 57.4 of the book truck 56. The books 20 may be placed within the book truck 56 on one of shelves 57.1, 57.2, 57.3, 57.4 chosen according to the identity of the book 20, and the placement may be directed by the information management system 110.

Figure 7A:
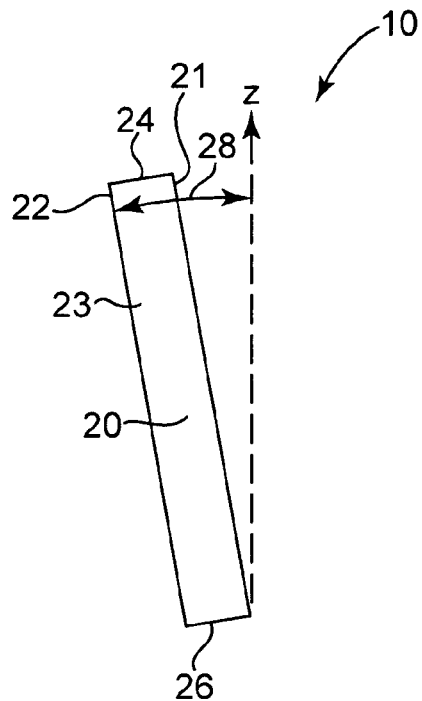
FIG. 7A illustrates in a frontal view an exemplary embodiment of a book in the near vertical orientation.

FIG. 7A illustrates an implementation of book 20 in the near vertical orientation. As illustrated, the book is positioned such that the first cover portion 21 and the second cover portion 22 are generally aligned along the vertical (z) axis. As illustrated, the spine 23 is generally aligned with the vertical (z) axis. The second cover portion 22 in this illustrated embodiment defines book angle 28 with respect to the vertical (z) axis. The book angle ranges 28 ranges between about 0° and about 45° in various embodiments, and may be about 10° in certain embodiments.

Figure 7B:
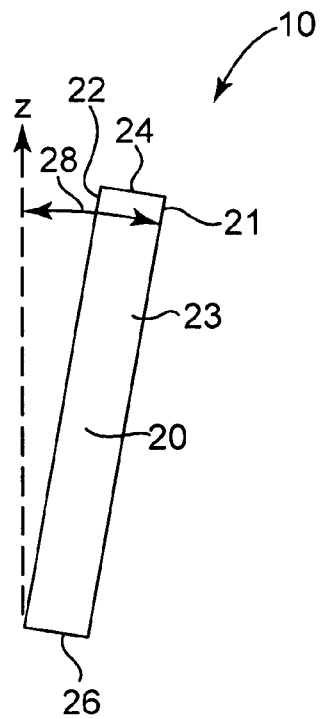
FIG. 7B illustrates in a frontal view another exemplary embodiment of a book in the near vertical orientation.

FIG. 7B illustrates another implementation of book 20 in the near vertical orientation. As illustrated, the book is positioned such that the first cover portion 21 and the second cover portion 22 are generally aligned along the vertical (z) axis. As illustrated, the spine 23 is generally aligned with the vertical (z) axis. The first cover portion 21 in this illustrated embodiment defines book angle 28 with respect to the vertical (z) axis. The book angle ranges 28 ranges between about 0° and about 45° in various embodiments, and may be about 10° in certain embodiments.

Methods for aggregating books 20 returned to a library are disclosed herein. In various aspects, the methods include receiving the book 20 through slot 30 in the near vertical orientation, transporting the book 20 about the conveyor system 20 in the near vertical orientation, and delivering the book 20 from the conveyor system into the book collector 50 in the near vertical orientation. The methods, in various aspects, include positioning the conveyor segment 270 to deliver the book 20 into the book collector 50. In various aspects, the conveyor system 70 is formed with multiple conveyor segments 270 and the methods may include altering the conveyor segments 270 engaging with a particular conveyor segment 270 by repositioning the particular conveyor segment 270. Changing the path the book 20 traverses through the conveyor system 70 by repositioning one or more conveyor segments 270 may be included in the methods. Any of directing the path the book 20 traverses through the conveyor system 70, delivering the book 20 to a particular book collector 50 including a portion thereof wherein the particular book collector 50 is chosen from a plurality of book collectors 50 as directed by the information management system 110 based upon the identity of the book 20 and/or status of the book collector(s) 50 may be included in the methods. In various aspects, the methods may include orienting the book collector using lift 60 to receive book 20 in the near vertical orientation from the conveyor system 70. The methods may also include orienting the book 20 with slot 30 in passing the book 20 therethrough. Detecting the identity of the book may be included in the methods. Demonstrating the receiving of the book 20 by the patron interface 112 is included in the methods in various aspects.

The foregoing discussion discloses and describes merely exemplary implementations. Upon study of this specification, one of ordinary skill in the art will readily recognize from such discussion, and from the accompanying figures and claims, that various changes, modifications and variations can be made therein without departing from the spirit and scope of the following claims.

What is claimed is:

1. A book handling apparatus, comprising:
a book receiver that defines a near vertically orientated slot therethrough, the slot adapted to guide a patron to place a book therein with the book in a near vertical orientation; and
a detector positioned about the slot to detect the identity of the book;
a conveyor system operably engaged with the slot to receive the book from the slot in the near vertical orientation, the conveyor system including one or more arms in contact with the book to convey the book thereabout in the near vertical orientation;
wherein the near vertical orientation is defined by an angle between 0° and 45° in which 0° is a vertical position of a book and wherein the vertical position of the book is a position where a spine, first cover and second cover of the book are perpendicular to a horizontal surface in relation to a patron standing in proximity to the apparatus.

2. The book handling apparatus, as in claim 1, further comprising: a book collector operably disposed proximate the conveyor system to receive the book therein from the conveyor system with the book in the near vertical orientation.

3. The book handling apparatus, as in claim 2, wherein the book collector is configured as a book truck with shelves disposed at a first shelf angle between about 0° and about 45° and at a second shelf angle between about 0° and about 45°.

4. The book handling apparatus, as in claim 1, wherein the conveyor system comprises at least one conveyor segment, the conveyor segment includes a conveyor belt that defines a conveyor surface and the arm that defines an arm surface, the arm disposed with respect to the conveyor belt such that the arm surface generally forms a right angle with respect to the conveyor surface, the arm surface disposed at a first angle between about 0° and about 45°.

5. The book handling apparatus, as in claim 4, wherein the arm surface is disposed at a first angle of about 10°.

6. The book handling apparatus, as in claim 1, wherein the conveyor system comprises at least one conveyor segment, the conveyor segment includes a conveyor belt that defines a conveyor surface and the arm that defines an arm surface, the arm disposed with respect to the conveyor belt to define a conveyor platform, the arm surface disposed at a first angle between about 0° and about 45°, the conveyor surface disposed at a second angle between about 0° and about 45°.

7. The book handling apparatus, as in claim 6, wherein the arm surface is disposed at a first angle of about 10°, the conveyor surface is disposed at a second angle of about 10°.

8. The book handling apparatus, as in claim 1, wherein the slot defines a slot angle of between about 0° and about 45° from a vertical orientation.

9. The book handling apparatus, as in claim 1, wherein the slot defines a slot angle of about 10° from a vertical orientation.

10. The book handling apparatus of claim 1, wherein the slot has a height greater than a width.

11. A book handling apparatus, comprising:
a book receiver with a book receiver first side and a book receiver second side and defining a near vertically orientated slot therebetween, the slot adapted to receive a book in a near vertical orientation from the book receiver first side;
a detector positioned about the slot to detect the identity of the book;

a conveyor system operably connected to the slot about the book receiver second side to receive the book in the near vertical orientation thereupon and including one or more arms in contact with the book to convey the book thereabout in the near vertical orientation;

a plurality of book collectors, the book collectors operably disposed about the conveyor system to receive the book in the near vertical orientation from the conveyor system;

an information management system, the information management system in communication with the detector to determine the identity of the book and in communication with the conveyor system to direct the book to a book collector chosen by the information management system from the plurality of book collectors;

wherein the near vertical orientation is defined by an angle between 0° and 45° in which 0° is a vertical position of a book and wherein the vertical position of the book is a position where a spine, first cover and second cover of the book are perpendicular to a horizontal surface in relation to a patron standing in proximity to the apparatus.

12. The book handling apparatus, as in claim 11, wherein the conveyor system comprises a multiplicity of conveyor segments, at least one conveyor segment positionable to alter the communication thereof with at least two conveyor segments of the multiplicity of conveyor segments.

13. The book handling apparatus, as in claim 11, wherein the conveyor system comprises at least one conveyor segment positionable to alter the communication thereof with at least two book collectors of the plurality of book collectors.

14. The book handling apparatus, as in claim 11, wherein the book receiver defines a multiplicity of slots and the conveyor system comprises one or more conveyor segments, at least one of the one or more conveyor segments is positionable to engage a first slot and a second slot from amongst the multiplicity of slots.

15. A method, comprising:
receiving a book into a near vertically orientated slot from a patron, the slot causing the orienting of the book into a near vertical orientation when entered into the slot for returning the book into a library or book repository;

detecting the identity of the book with a detector positioned about the slot;

communicating the book in the near vertical orientation from the slot onto a conveyor system;

conveying the book about the conveyor system in the near vertical orientation by contact with one or more arms; and delivering the book in the generally vertical orientation into a book collector by the conveyor system;

wherein the near vertical orientation is defined by an angle between 0° and 45° in which 0° is a vertical position of a book and wherein the vertical position of the book is a position where a spine, first cover and second cover of the book are perpendicular to a horizontal surface in relation to a patron standing in proximity to the apparatus.

16. The method, as in claim 15, further comprising delivering the book into a particular book collector chosen from amongst a plurality of book collectors using the identity of the book.

17. The method, as in claim 16, wherein the book is delivered into a particular portion of the book collector.

18. The method, as in claim 15, wherein detecting the identity of the book includes identifying the book using a bar code detector through a transparent panel with the book in the vertical orientation.

19. The method of claim 15, wherein receiving the book into the slot includes receiving the book in a slot with a greater height than width.

\* \* \* \* \*